United States Patent
Matsuda et al.

(10) Patent No.: US 6,820,112 B1
(45) Date of Patent: Nov. 16, 2004

(54) INFORMATION PROCESSING SYSTEM, INFORMATION PROCESSING METHOD AND APPARATUS, AND INFORMATION SERVING MEDIUM

(75) Inventors: Koichi Matsuda, Tokyo (JP); Koji Matsuoka, Kanagawa (JP); Masashi Takeda, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/520,910

(22) Filed: Mar. 7, 2000

(30) Foreign Application Priority Data

Mar. 11, 1999 (JP) ......................................... P11-065184

(51) Int. Cl.⁷ ........................ G06F 15/16; G06T 15/00; G06T 15/70; G09G 5/00
(52) U.S. Cl. ...................... 709/203; 345/419; 345/473; 345/706; 345/757; 345/849; 345/854; 709/204; 709/208
(58) Field of Search .......................... 703/203; 345/355, 345/473, 419, 329, 435, 706, 757, 849, 854; 395/200; 700/86; 709/203, 204, 208

(56) References Cited

U.S. PATENT DOCUMENTS

| | | | |
|---|---|---|---|
| 5,393,070 A | 2/1995 | Best | 273/434 |
| 5,572,646 A | 11/1996 | Kawai et al. | 395/501 |
| 5,586,257 A | 12/1996 | Perlman | 463/42 |
| 5,623,428 A * | 4/1997 | Kunii et al. | 345/473 |
| 5,659,691 A | 8/1997 | Durward et al. | 395/329 |
| 5,727,950 A | 3/1998 | Cook, deceased et al. | 434/350 |
| 5,754,740 A | 5/1998 | Fukuoka et al. | 395/68 |
| 5,761,644 A | 6/1998 | Ueda et al. | 705/1 |
| 5,802,296 A | 9/1998 | Morse et al. | 395/200.38 |
| 5,812,126 A | 9/1998 | Richardson et al. | 345/330 |
| 5,848,134 A | 12/1998 | Sekiguchi et al. | 379/93.15 |
| 5,850,352 A | 12/1998 | Moezzi et al. | 364/514 A |
| 5,880,731 A | 3/1999 | Liles et al. | 345/349 |
| 5,926,179 A | 7/1999 | Matsuda et al. | 345/355 |
| 5,941,770 A | 8/1999 | Miers et al. | 463/13 |
| 5,956,028 A | 9/1999 | Matsui et al. | 345/329 |
| 5,956,038 A | 9/1999 | Rekimoto | 345/419 |
| 5,956,485 A | 9/1999 | Perlman | 395/200.34 |
| 5,966,129 A | 10/1999 | Matsukuma et al. | 345/418 |
| 5,966,526 A | 10/1999 | Yokoi | 395/500.32 |
| 5,971,855 A | 10/1999 | Ng | 463/42 |
| 5,982,372 A | 11/1999 | Brush, II et al. | 345/418 |
| 5,983,003 A | 11/1999 | Lection et al. | 395/200.32 |
| 6,005,548 A * | 12/1999 | Latypov et al. | 345/156 |
| 6,009,460 A | 12/1999 | Ohno et al. | 709/204 |
| 6,310,627 B1 * | 10/2001 | Sakaguchi | 345/435 |
| 6,320,988 B1 * | 11/2001 | Yamaguchi et al. | 345/473 |
| 6,377,263 B1 * | 4/2002 | Falacara et al. | 345/473 |
| 6,449,518 B1 * | 9/2002 | Yokoo et al. | 700/86 |

FOREIGN PATENT DOCUMENTS

| | | | | |
|---|---|---|---|---|
| JP | 7-160853 | 6/1995 | | G06F/15/62 |
| JP | 9-81781 | 3/1997 | | G06F/15/62 |

OTHER PUBLICATIONS

Nikkei Electronics, Sep. 9, 1996, (No. 670), pp. 151–159.

(List continued on next page.)

Primary Examiner—Joseph H. Feild
Assistant Examiner—Chau Nguyen
(74) Attorney, Agent, or Firm—Oblon, Spivak, McClelland, Maier & Neustadt, P.C.

(57) ABSTRACT

An AO server 100, shared server 105 and a client PC 110 are connected to one another via the Internet to build virtual community space accessible from a plurality of client PCs 110, 120, 130, 140, ... A movement interpretation node 112 for a virtual living object 111 is provided at the client PC 110 for example, and an object management node 102 for the virtual living object 101 (111) in the virtual community space is provided at the AO server 100. Thus, the movement and structure of an object in a virtual space can freely be changed or modified.

18 Claims, 14 Drawing Sheets

OTHER PUBLICATIONS

Nikkei Electronics, Jul. 4, 1997, (No. 686), pp. 131–134.

K. Matsuda, "Latest Trends of VRML and Cyberpassage VRML 2.0 and Java," Part 1, Bit, vol. 28, No. 7, Jul. 1996, pp. 29–36, English Translation pp. 1–25.

K. Matsuda, "Latest Trends of VRML and Cyberpassage VRML 2.0 and Java," Part 2, Bit, vol. 28, No. 8, Aug. 1996, pp. 57–65, English Translation pp. 1–27.

Y. Honda, "Latest Trends of VRML and Cyberpassage VRML + Network= Cyberspace?" Part 3, Bit, vol. 28, No. 9, Sep. 1996, pp. 29–36, English Translation pp. 1–.

Y. Honda, "Latest Trends of VRML and Cyberpassage How to Build Multi–User Environment Using Cyberspace," Part 4, Bit, vol. 28, No. 10, pp. 49–58, English Translation pp. 1–27.

C. Morningstar et al. The Lessons of Lucasfilm's Habitat, *Cyberspace: First Steps*, Mit Press, 1992, pp. 273–301.

S. Chen et al., "The Out of Box Experience: Lessons Learned Creating Compelling VRML 2.0 Content," Proceedings of the Second Symposium on Virtual Reality Modeling Language, Feb. 1997, pp. 83–92.

B. Damer et al., People Online Virtual Worlds: A New Home for Cooperating Communities, A New Frontier for Interaction Design (Panel), Proceedings of the ACM Conference on Computer Supporter Cooperative Work, Nov. 1996, pp. 441–442.

S. Harrison et al., "Re–Placeing Space: The Roles of Place and Space in Collaborative Systems," Proceedings of the ACM Conference on Computer Supporter Cooperative Work, Nov. 1996, pp. 67–76.

R. Lea et al., "Community Place: Architecture and Performance," Proceedings of the Second Symposium on Virtual Reality Modeling Language, Feb. 1996, pp. 41–50.

B. Damer, Inhabited Virtual Worlds: A New Frontier for Interaction Design, Interactions, vol. 3, Issue 5, Sep./Oct. 1996, pp. 27–34.

W. Broll., "Populating the Internet: Supporting Multiple Users and Shared Applications With VRML," Proceedings of the Second Symposium on Virtual Reality Modeling Language, Feb. 1997, pp. 33–40.

D. Kurlander et al., "Comic Chat," Proceedings of the 23RD Annual Conference on Computer Graphics, Aug. 1996, pp. 225–236.

Ultima III Manual and Selected Pages from Ultima I–VIII, Collection Manual.

K. Perlin et al., "Improv: A System for Scripting Interactive Actors in Virtual Worlds," Proceedings of the 23rd Annual Conference on Computer Graphics, Aug. 1996, pp. 205–216.

M. Pesce, "VRML Browsing & Building Cyberspace," New Riders Publishing 1995, pp. 43–81.

"Sony Begins OEM Sales of Community Place VRML 2.0 3D Internet Browser and Multi–User Server Software," Jan. 30, 1997 Press Release, Material Collected from the Internet, http://www.world.sony.com/corporateinfo/news–E/199701/9701–30/index.html, 3 pages.

"VRML 2.0 Laboratory–How to Create," Material Collected from the Internet, Mar. 8, 2000, http://www.ses.co.jp/ses/staff/kan/howto/howto01.html, 5 pages.

Virtual Reality Modeling Language Version 2.0, ISO/IEC CD 14772, Aug. 4, 1996, Section 4, "Concepts".

U.S. patent application Ser. No. 09/081,147, filed May 19, 1998.

U.S. patent application Ser. No. 09/084,515, filed May 26, 1998.

U.S. patent application Ser. No. 09/205,947, filed Dec. 4, 1998.

U.S. patent application Ser. No. 09/229,818, filed Jan. 13, 1999.

* cited by examiner

PARAMETER MANAGEMENT TABLE

| NO | VIRTUAL LIVING OBJECT DATA | | | | | | | OBJECT PARAMETERS | | USER DATA | | | RESERVED |
|---|---|---|---|---|---|---|---|---|---|---|---|---|---|
| | 3D OBJECT ID | COORDI-NATE | TYPE | SEXUALITY | NICK-NAME | BIRTH-DAY | PERMANENT-ADDRESS COMMUNITY SPACE | STRUCTURE AND MOVEMENT PARAMETERS | ACTION AND CHARACTER PARAMETERS | NAME | COMMUNI-CATING MEANS | CONTACT ADDRESS | |
| 1 | Obj1 | x1,y1,z1 | MONKEY | MALE | TARO | 970112 | ZOO | | | | 0 | | |
| 2 | Obj2 | x2,y2,z2 | CAT | FEMALE | MIKE | 970210 | PAEK | | | | 1 | | |

| COMMUNICATING MEANS | |
|---|---|
| 0 | ELECTRONIC MAIL |
| 1 | TELEPHONE (ANALOG SOUND) |
| 2 | PHS MAIL SERVICE |
| 3 | FACSIMILE |
| 4 | PAGER |
| 5 | RESERVED |
| 6 | RESERVED |
| 7 | RESERVED |

FIG.8

STRUCTURE AND MOVEMENT PARAMETERS

| HEIGHT (cm) | WIEGHT (kg) | JOINT ID | COORDINATE | MATING JOINT | INTERARTICULAR LENGTH (cm) | MOVING LIMIT (ANGLE) |
|---|---|---|---|---|---|---|
| 180 | 70 | J1 | x11,y11,z11 | J2 | 20 | 120 |
| | | J2 | x21,y21,z21 | J1,J3,J4 | 20,15,15 | 60 |
| | | J3 | x31,y31,z31 | J2,J5 | 15,30 | 240 |
| | | J4 | x41,y41,z41 | J2,J7 | 15,30 | 240 |

FIG.10

| ACTION AND CHARACTER PARAMETERS | | | | | | | | | | |
|---|---|---|---|---|---|---|---|---|---|---|
| PHYSICAL INDEX | APPETITE INDEX | HEALTH INDEX | LIFE TIME REMAINDER | INTELLIGENCE QUOTIENT | SPEECH PERFORMANCE INDEX | SOCIABILITY INDEX | INDEPENDENCE INDEX | ACTIVITY INDEX | MOOD INDEX | |
| 5/10 | 6/10 | 4/10 | 240 | 2/10 | 5/10 | 2/10 | 1/10 | 5/10 | 5/10 | |

FIG.11

INFORMATION PROCESSING SYSTEM, INFORMATION PROCESSING METHOD AND APPARATUS, AND INFORMATION SERVING MEDIUM

BACKGROUND OF THE INVENTION

1. Field of the Invention

The present invention relates to an information processing system, information processing method and apparatus, and an information serving medium, and more particularly, to an information processing system, information processing method and apparatus, and an information serving medium, adapted to define the structure and movement of a virtual living object in a virtual space and manage the action and character of the virtual living object.

2. Description of the Related Art

In the field of the so called personal computer communication service (e.g., NIFTY-Serve (trademark) in Japan, CompuServe (trademark) in USA, etc.) that a plurality of users connect their own personal computers to a host computer in a communication service center via modems and public telephone networks and access the host computer based on a predetermined communication protocol, services to provide a vial community space called "cyberspace" (e.g., Habitat (trademark), etc.) are known.

Note that the development of the above Habitat was started by the LucasFilm, USA, in 1985 and had been in service for about three years by the QuantumLink a commercial network in USA, and it was put into service as the Fujitsu Habitat (trademark) by the NIFTY-Serve in February, 1990. The Habitat provides a service to enable the user to send his alter ego called "avatar (incarnation of a god in the Indian myth)" to a virtual city called "Populopolis" depicted by the 2D (two-dimensional) graphics and where the user can have a chat with the other users of the same communication service. The "chat" is a text-based real-time conversation in which the users can take participate by typing a line of text words and watching their display screens. Further details are referred to "Cyberspace: First Steps", Michael Benedikt, ed. MIT PressCambridge, Mass. ISBNO-262-02327-X, pp. 282–307.

In the conventional cyberspace systems operated in the personal computer communication services of this type, the virtual streets lined with stores and houses and room interior are depicted by the 2D graphics and the avatar to be moved away from this side or towards this side can only be moved up and down in the background of the 2D graphics. That is, the conventional cyberspace systems cannot provide a sufficient representation of an avatar's walking and movement in the virtual space for a virtual experience of them. Also, in the conventional cyberspace systems, a virtual space in which an avatar being an alter ego of the user and those of the other users are represented will be viewed through the third party's eyes, so no satisfactory virtual experience cannot be assured.

To avoid the above drawbacks, it has been proposed as in the disclosure of the Japanese Unexampled Patent Publication No. 9-81781 to represent a virtual space by the 3D (three-dimensional) graphics and use a three-dimensional graphic data descriptive language called VRML (Virtual Reality Modeling Language) to implement a fiction that the user can freely walk around with the avatar's viewpoint. Also, various types of cyberspace in which the avatar being alter ego of the user can have a chat with the other users are considered in the Journal "Nikkei Electronics", Sep. 9, 1996 (No. 670), pp. 151–159.

Recently, there have been commercially available personal computer game software such as a fish feeding simulation game, a simulation game for feeding a virtual creature having an artificial intelligence and living in a virtual space, etc. Also, there has been proposed an electronic notebook adapted for the user to display on a screen thereof a simulated pet such as a dot, cat or the like which grows up step by step and amuse himself or herself by watching the process of their growth (see the Nikkei Electronics, Jul. 4, 1997 (No. 686), pp. 131–134). Moreover, an egg-sized portable electronic pet in which a feeding simulation game software of this type is installed is widely known (under the trademark "Tamagocchi" of the Bandai).

This type of portable electronic pet uses a single-chip LSI (large scale integrated circuit) having built therein a CPU (central processing unit), a ROM in which such a feeding simulation game software is stored, a RAM, and the like, and it has also a LCD (liquid crystal display) screen on which a figure and status of a virtual pet are displayed. The user of this product operates control buttons to give commands "feed", "clean", etc. necessary for feeding the virtual creature as a pet. As a result, the virtual creature displayed on the LCD screen will grow up changing in appearance in the process of growing from an egg step, chick step and to an adult bird step, for example.

The game software is so programmed that at each button operation by the user, the virtual creature will grow smoothly if the command from the user is appropriate while it will be sick or die if the command is not appropriate. Further, a calender timer is included in the software. Based on an elapsed time from the birth of the virtual creature, defined by the calender timer, the virtual creature will make various requests to the user. The requests include a desire for sleep when in the night time zone, request for a meal when in the mealtime zone, request for a snack, and a desired for playing at any time, for example. If the user cannot respond to such requests properly, the virtual creature will grow slow and become ill-minded. If the requests are properly satisfied by the user, the virtual creature lives a longer life.

A technique to display an image corresponding to each step of growth of an animal or plant is disclosed in the Japanese Unexamined Patent Publication No. 7-160853, for example. This is applicable to an electronic notebook. More specifically, bit map images for various steps of growth of a plant character are stored in a ROM. At each stage of growth, a corresponding plant character is displayed on an LCD screen of the electronic notebook, and also characters of plant developing elements (water, light and fertilizer) previously stored in the ROM are displayed on the LCD screen. By key input of doses of the plan developing elements, values of the plant developing elements corresponding to the entered doses are set in water, light and fertilizer dose registers, respectively, in the RAM. Based on these values in the registers, new degree of growth is calculated and a plant character corresponding to the calculated degree of growth is read from the ROM and displayed on the LCD screen. Thus, the steps of the plant growth corresponding to the conditions of plant development entered by the user are displayed.

However, the action, structure, etc. of an object (character) in the above-mentioned virtual space are defined by the service provider and cannot freely be changed or modified by a client (user).

OBJECT AND SUMMARY OF THE INVENTION

It is therefore an object of the present invention to provide an information processing system, information processing method and apparatus, and an information serving medium, adapted such that the action, structure, etc. of an object in a virtual space can freely be changed or modified by the user.

The above object can be attained by proving an information processing system in which a server and a terminal are connected to each other via a network, a virtual community space accessible from a plurality of such terminals is built, a node for interpretation of the movement of a virtual living object is provided at each of the terminals, and a management node for the virtual living object in the virtual community space is provided at the server.

Also, the above object can be attained by providing an information processing method and apparatus, in which a virtual living object is built, a terminal is connected to a server via a network, a virtual community space is built based on information supplied from the server, and the virtual living object is transmitted along with a movement interpretation node to the virtual community space.

Also, the above object can be attained by providing an information processing method and apparatus, in which a server is connected to a terminal via a network, a virtual living object built by the terminal and a movement interpretation node are received, and a management node for the virtual living object in a virtual community space is generated based on the movement interpretation node.

Also, the above object can be attained by providing an information serving medium for serving a computer program including the steps of interpreting at least the structure of a virtual living object built as a one which can be provided in a virtual community space, communicating with a master managing mechanism which manages the virtual living object in the virtual community space, and moving the built life object based on data generated by the master managing mechanism to control at least the action of the virtual living object.

In the information processing system, information processing method and apparatus and information serving medium according to the present invention a movement interpretation node for a virtual living object is provided at a terminal, and management node for the virtual living object in a virtual community space is provided at the server, thereby permitting the user to freely change or modify the movement, structure, etc. of the virtual living object.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 8 shows an example of parameter management table;

FIG. 10 explains an example of structure and movement parameters;

FIG. 11 explains an example of action and character parameters;

DETAILED DESCRIPTION OF THE PREFERRED EMBODIMENTS

Figure 1:
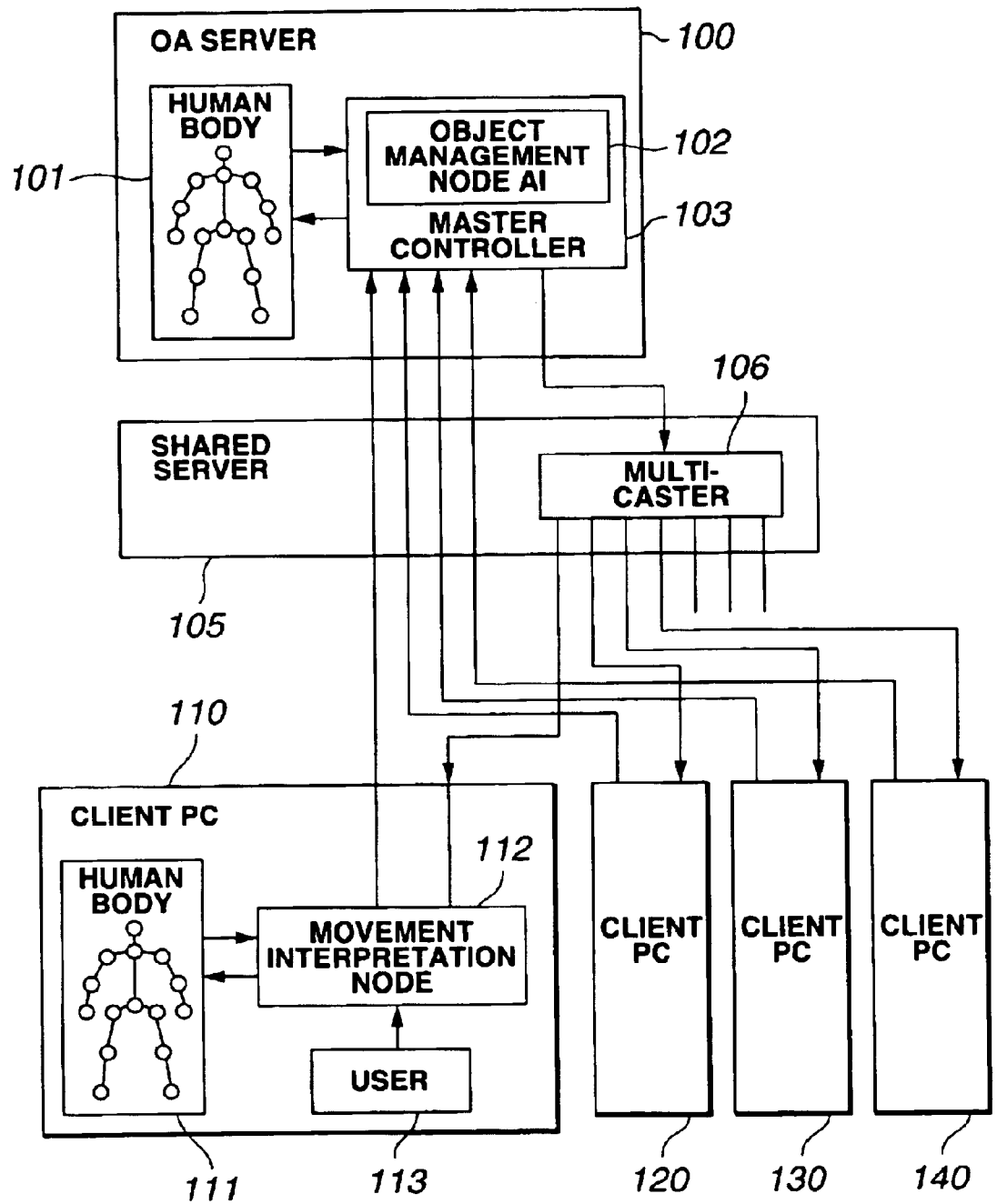
FIG. 1 shows the base configuration of an embodiment of the information processing systems according to the present invention.

Prior to proceeding to the explanation of the embodiment of the present invention, the VRML (Virtual Reality Modeling Language), a descriptive language usable in the Internet, a worldwide computer internetwork, to handle three-dimensional information commonly in the framework of the WWW (Space-Wide Web) which serves various kinds of information, will briefly be described below.

The VRML is a three-dimensional graphics describing language enabling to describe a three-dimensional space and set hypertext links for an object depicted by a three-dimensional graphics, thereby permitting to access WWW servers one after another while tracking the hypertext links, and a VRML browser has been developed for representation of the three-dimensional space described in the VRML. Further details are referred to the "VRML: Browsing & Building Cyberspace, Mark Pesce", 1995 New Readers Publishing ISBN 1-56205-498-8 and "Recent Trend of VRML and CyberPassage". Kouichi Matsuda and Ysuaki Honda, Bit (Kyouritsu Shuppan), 1996, No. 7 Vol. 29–36, 57–65, 9–29 and 29–36, No. 10 pp. 49–58. Also, the official and complete specification of the VRML in the Virtual Reality Modeling Language Version 2.0 ISO/IEC CD 14772 issued Aug. 4, 1996 is open to the public at the Internet home page "http://www.vrml.org/tehnicalinfo/specifictions/vrml97/index.htm" (its version in Japanese is open to the public at the Internet home page "http://www.webcity.co.jp/info/andoh/VRML/vrml12.0/spec-jp/index.html"). Furthermore, a browser and shared server software for VRML 2.0 has been developed by and commercially available from the Sony, the applicant of the present invention, under the trademark "Community Place Browser/Bureau", of which a version (sample) can be downloaded from the Internet home page "http://vs. sony co.jp".

To build a virtual three-dimensional space using such a VRML 2.0, an VRML file representing a desired content is generated by preparing, in the VRML, graphic data indicative of a shape, movement, position, etc. of an object in a virtual space (modeling), adding, to the model in the screen displayed virtual space, a switch (sensor) which will generate an event when pointed by clicking the mouse for example (addition of sensor), programming a script which will implement an event generated correspondingly to the pointing to the sensor (scripting), and routing between an operation made to the sensor and the graphic data and script such as start of a script (graphic data, script and common node such as write defined in the VRML will also be referred to as "node" hereinafter). For example, how to write VRML 2.0 and sample data are explained at the Internet home page "http://www.ses.co.jp/SES/STAFF/kan/howto/howto1.html".

In the VRML 2.0, data consists of a node and field. The field will pass a variable to the node to designate a parameter of the node. The field may be omitted. In case the field is omitted, a default value is used for it. The field includes a "single value field (SF)" having a single value and a "multi-value field (MF)" having multiple values. The node functions and field are referred to "Appendix1: VRML 2.0 Node List".

In the VRML 2.0, there is defined a mechanism for implementation of behavior in the VRML virtual space. The mechanism of the behavior is disclosed in detail in Chapter 4. Concepts of the specification "Virtual Reality Modeling Language Version 2.0, ISO/IEC CD 14772 opened at the Internet home page "http://www.vrml.org/tehnicalinfo/specifications/vrml97/index.htm" and its Japanese version "http://www.webcity. co.jp/info/andoh/VRML/VRML.2.0/spec-jp/part1/concepts.html". The chapter 4 covers key concepts for utilization of the VRML specification, such as general items concerning various nodes, including how to combine a node in a scene graph, how to generate and receive an event by a node, how to prepare a node type by a prototype, how to export for addition of a node type to the VRML and for external use of it, and how to combine in the VRML file a script opening as a program.

There has been proposed a technique for management of the action and character of a virtual living object in a virtual community space by providing at a user (client PC) a node enabling to build at the client PC a virtual living object in a virtual community space and defining the bones, joints, surface condition, limits of joint movement, and movement of the bones and joints, for example, of the built virtual living object (will be referred to as "movement interpretation node" hereinafter), transferring to a serve a virtual living object having the movement interpretation node, built by the client PC, generating, at the server, an manager for the virtual living object based on the movement interpretation node, and applying a mechanism which can implement the behavior as defined in the VRML 2.0. Note that the virtual living object includes various types such as human type, animal type, etc.

Referring now to FIG. 1, there is schematically illustrated an embodiment of the information processing system according to the present invention, in which for example a human type virtual living object is built at a user's client PC (personal computer) 110, and there is generated at an AO server 100 a manager to manage the action, character, etc. of the virtual living object based on a structure interpretation node of the virtual living object.

As shown in FIG. 1, each of the client PCs 110, 120, 130, 140, . . . (of which only the client PC 110 will be take hereinafter for the simplicity of the illustration and description of the present invention) is for example a personal computer terminal (actually, the terminal is a keyboard, mouse or the like the user operates) 113, and connectable to the Internet or the like via a variety of communication lines such as public telephone lines led to homes. The client PC 110 has installed a program for a movement interpretation node 112 which defines the bones and joints, and limits of joint movement and the movement of the bones and joints of for example a human type virtual living object 111. That is, the movement interpretation node 112 includes a software module, for example, a program having communication functions described in the so-called Java (trademark of the Sun Microsystems, USA) or the like, and can recognize the arthromeres and parts (e.g., head, hands, feet, etc.) of the virtual living object built in conformity to a predetermined standard. Each client PC sends data on the virtual living object 111 having the movement interpretation node to a shared server 105 via the Internet or the like.

The above shared server 105 is to manage the position and movement of a three-dimensional object shared in a virtual community space and also the communication between an AO (application object) server 100 and each client PC 110. For example when data on the virtual living object 111 has been transmitted from the client PC 110, it will be transferred to a master controller 103 of the AO server 100. When data on virtual living objects 101 in the virtual community space have been transmitted from the AO server 100, they will be transmitted simultaneously to multiple client PCs by a multi-casing facility 106. Also, when the client PC 110 has made some action in response to the virtual living object in the virtual community space, the position and movement of the three dimensional object are managed correspondingly to the action, and the action is transferred to the AO server 100.

The AO server 100 manages, by the master controller 103, the behavior (action, character, etc.) of each of virtual living objects in the virtual community space. Also, the master controller 103 in the AO server 100 transmits and receives information to and from the shared server 105.

When the virtual living object 111 with the movement interpretation node 112 has entered into the virtual community space, the communication facility included in the movement interpretation node 112 provides a communication with the master controller 103 in the AO server 100. Note that actually, to enter the virtual living object 111 generate at the client PC 110 into the virtual community space, a browser is started up at the client PC 110 to open the window to the virtual community space and the virtual living object 111 is entered into the virtual community space by drag and drop for example.

Thus, when the virtual living object 111 having the movement interpretation node 112 has come into the virtual community space, the master controller 103 of the AO server 100 will communicate with the movement interpretation node 112, thereby generating a manager for the virtual living object 112 having the movement interpretation node 112 (will be referred to as "object management node 102" hereinafter). The object management node 102 will extract from the movement interpretation node 112 parameters which define the bones and joints, and limits of joint movement, and movement of the bones and joints, and determine the movement, character, etc. of the virtual living object 101 in the virtual community space based on the parameters. In the following, the parameters defining the bones and joints, limits of joint movement, and the movement of the bones and joints of the virtual living object 111 will be referred to as "structure and movement paramter" while the parameters defining the movement and character of the virtual living object 101 will be referred to as "action and character parameters".

As having been described in the above, the virtual living object 101 (111) to be managed by the object management node 102 of the AO server 100 is transmitted to the plurality of client PCs 110, 120, 130, 140, . . . by the multi-casting facility 106 of the shared server 105 at the same time. Thus, at each client PC, there will exist in the shared virtual space the plurality of virtual living objects 101 generated at the multiple client PCs and managed by the object management node 102 corresponding to the AO server 100, and virtual living objects generated and managed by the AO server 100 itself.

At this time, the movement interpretation node 112 of the client PC 110 communicates with the master controller 102 of the AO server 100 to enable a variety of actions such as joint movement, voicing, facial expression, etc. of the virtual living object 101 in the virtual community space based on a standardized protocol.

Also, the object management node 102 incorporates a speech function, thinking function, remembering function and a learning function for the virtual living object 101. Therefore, the speech function of the object management node 102 enables virtual living objects to have a conversation between them in the virtual community space, the thinking and remembering functions enable to raise a virtual living object in the virtual community space by education and training, and the learning function enables a virtual living object to send itself an electronic mail. Also the object management node 102 permits each virtual living object to real-time interact, exchange greetings, talk, have a fight and fall in love, with the other in the virtual community space. Further, there can exist in the virtual community space a avatar for the user himself or herself and an object (bot) operable under any other computer program. Therefore, a conversation or the like is possible between the avatar and bot. In the Internet, there can exist a plurality of virtual community spaces whose virtual community spaces are different from one to another master controller 103 of the AO server 100 and can provide different services.

Referring now to FIGS. 2 to 7, there will be illustrated and described a flow of operations including basic operations in the information processing system having been described in the foregoing with reference to FIG. 1, generation of the virtual living object 111 at the client PC 110, management of the virtual community space by the shared server 105, management of the virtual living object1 101 by the AO server 100, etc.

Figure 2:
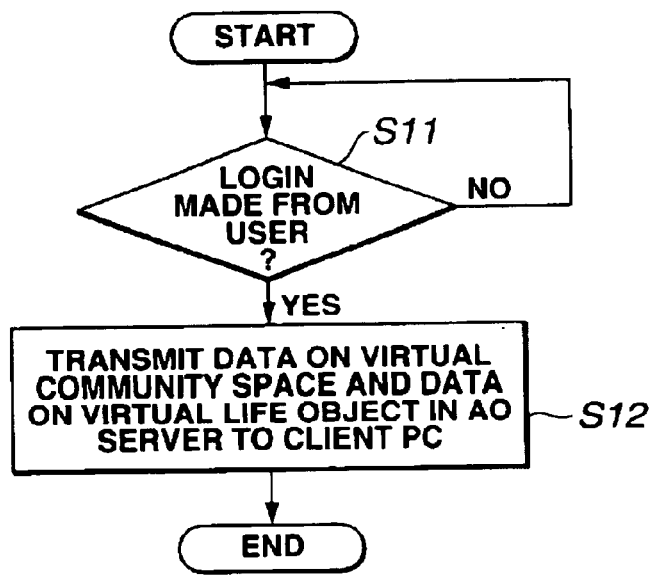
FIG. 2 is a flow chart of basic operations including serving a virtual community space from a shared server in the information processing system correspondingly to a login from a client PC (personal computer) and transmission of data of a virtual living object from an AO (application object) server.

FIG. 2 shows a basic flow of operations including serving from the shared server 105 of the information processing system in FIG. 1 of a virtual community space to a client PC 110 in response to a login from the client PC 110 and transmission from the AO server 100 of data on a virtual living object As shown in FIG. 2, the shared server 105 judges at step S11 whether a log has been made from the client PC 110, that is, the user 113. When it is judged that the login has been made, the system goes to step S12.

When the login has been made from the user 113, the shared server 105 transmits data on the virtual community space to the client PC 110 and transfers data on a virtual living object in the AO server 100 to the client PC 110.

Figure 3:
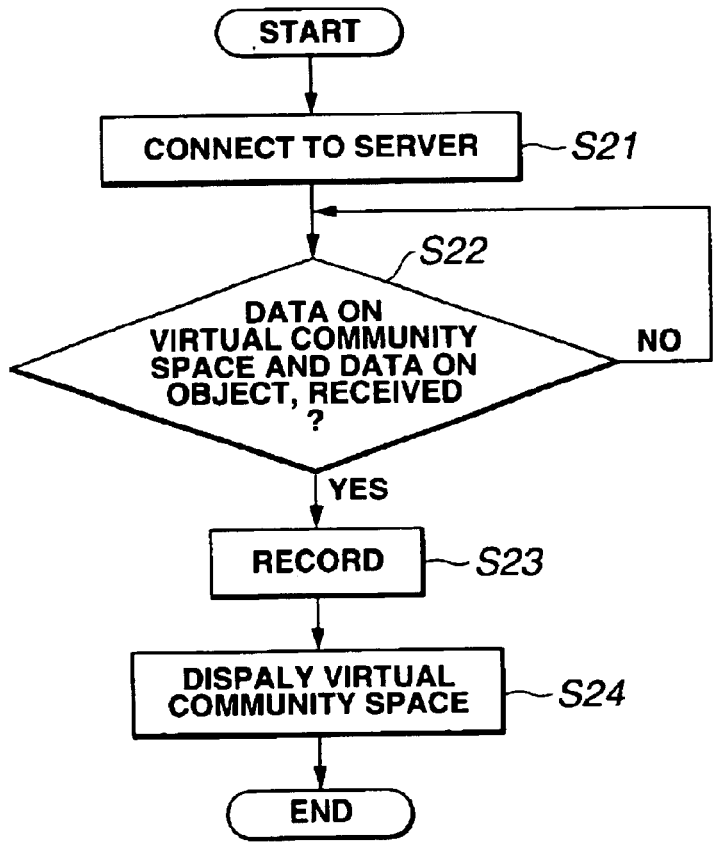
FIG. 3 is a flow chart of basic operations of the client PC when connected to the shared server.

FIG. 3 shows a basic flow of operations of the client PC 110 when connected to the shared server 105.

As shown in FIG. 3, the client PC 110 is connected to the shared server 105 at step S21 when a command for login is given from the user 113.

After connected to the shared server 105, the client PC 110 waits, at step S22, for reception of all data in the virtual community space and data on an object in the virtual community space.

When all data in the virtual community space and data on the object in the virtual community space are received at step S22, data are recorded into an internal hard disc or stored into an internal memory at step S23, and the virtual community space is displayed, at step S24, on a monitor screen based on the recorded data.

Figure 4:
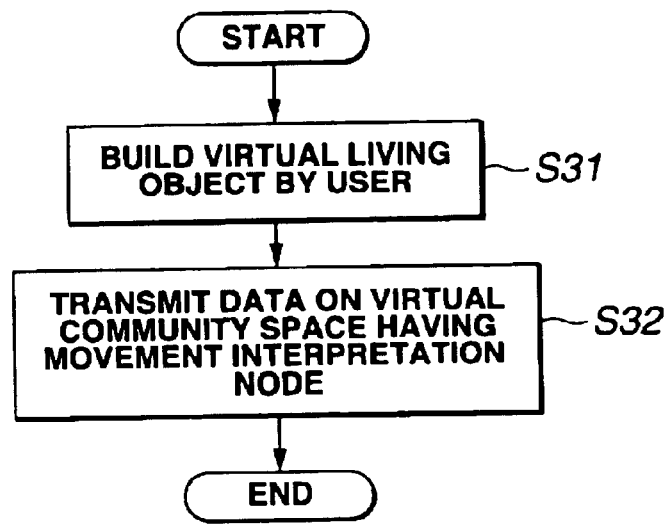
FIG. 4 is a flow chart of operations from generation of a virtual living object at the client PC up to transmission of the virtual living object to the AO server.

FIG. 4 shows a flow of operations from generation of a virtual living object 111 at the client PC 110 up to transmission of the virtual living object 111 to the AO server 100.

As shown in FIG. 4, the user 113 operates, at step S31, the client PC 110 to first build a virtual living object 111. This virtual living object 111 is built by combining the arthromeres or parts, for example, of the virtual living object. Each arthromere or part can be acquired from an Internet archive for example, or can be created by the user himself using an editor software or the like installed in the client PC. Note that the arthromeres or parts created by the user can be stored in the Internet archive. The arthromeres or parts thus stored in the Internet archive comply with a predetermined standard. Therefore, by combining the standardized arthromeres or parts, each user can freely build a virtual living object.

When the virtual living object 111 has been built at step S31, the movement interpretation node 112 at the client PC 110 transmits, at step S32, data on the virtual living object 111 having the movement interpretation node 112 to the server.

Figure 5:
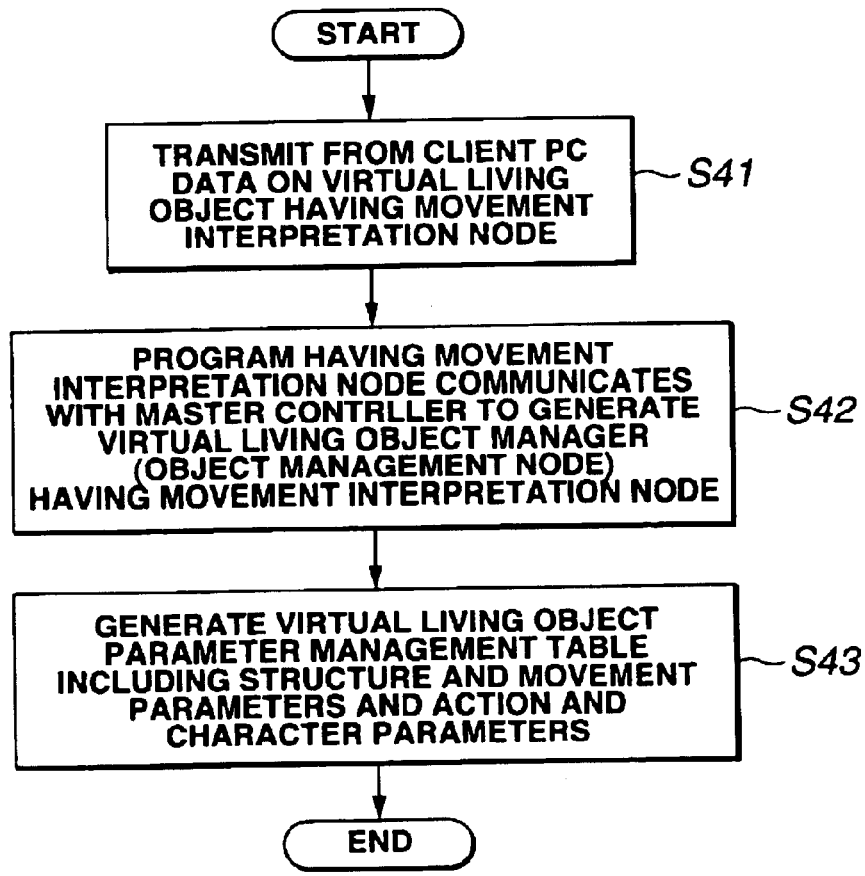
FIG. 5 is a flow chart of operations up to generation at the AO server of an object management node from a dual living object built at the client PC.

FIG. 5 shows a flow of operations up to generation, at the AO server 100, of an object management node from the virtual living object 111 built at the client PC 110.

As shown in FIG. 5, the master controller 103 of the AO server 100 receives, at step S41, from the client PC 110 the virtual living object 110 having the movement interpretation node 112.

At this time, a program having the movement interpretation node 112 communicates, at step S42, with the master controller 103 in the AO server 100 to generate a manager for the virtual living object 111 having the movement interpretation node 112 (object management node 102).

Next, the object management node 102 extracts, at step S43, from the movement interpretation node 112 structure and movement parameters which define the bones and joints, limits of joint movement, and movements of the bones and joints of the virtual living object 111, and generates a parameter management table from the parameters and action and character parameters which define the action and character of the virtual living object 101 in the virtual community space.

Figure 6:
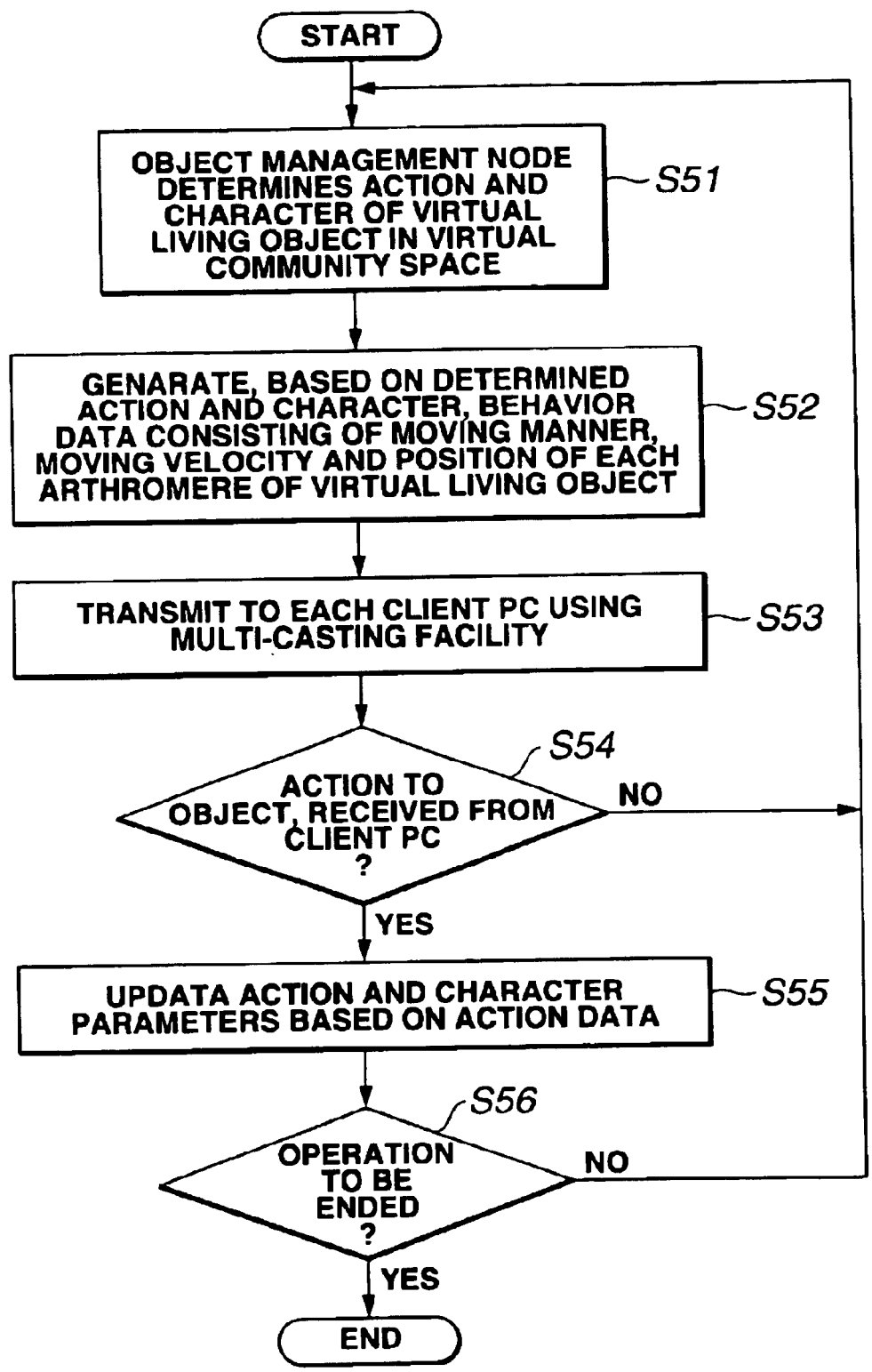
FIG. 6 is a flow chart of operations from determination of an action and character of a virtual living object based on the object management node up to updating of the action and character parameters correspondingly to a response from the client PC.

FIG. 6 shows a flow of operations from determination at the AO server 100 of an action and character of a virtual living object 101 based on the object management node 102, through transmission of the data on the virtual living object 101 from the shared sever 105 to the client PC 110, up to updating, at the AC server 100, of the action and character parameters of the object management node 102 correspondingly to a response (action) from the client PC 110.

As shown in FIG. 6, first the object management node 102 in the AO server 100 determines, at step S51, an action and character (action and character parameter values) of the virtual living object 101 by a mechanism which implements a behavior in the VRML virtual space defined by the aforementioned VRML 2.0 for example.

Next, the object management node 102 of the AO server 100 generates, at step S52, behavior data on the virtual living object 101, that is, behavior data including moving directions and moving velocity of the bones and joints, and positions of the virtual living object 101 before and after the movement, based on the determined action and character (action and character parameters). The behavior data generated by the AO server 100 will be sent to the shared server 105.

The shared server 105 transmits, at step S53, to the client PCs 110, 120, 130, 140, ... , the behavior data on the virtual living object 101, transferred from the AO server 100, by the multi-casting facility 106.

Thereafter, the AO server 100 judges, at step S54, whether there has been received action data entered by the user of each client PC for the virtual living object in the virtual community space. The action data entered by the user at the client PC 110 is to command an action the user desires to have the virtual living object do, by clicking a desired one of icons indicative of actions displayed on the monitor screen for example or by entering a command consisting of a kanji character and a symbol in combination for example.

If no action data has been received from each client PC at step S54, the operation returns to step S51 where a next movement of the virtual living object will be determined.

On the other hand, if an action data on the virtual living object has been received from the client PC at step S54, the AO server 100 will re-determine, at step S55, an action and character of the virtual living object 101 in the virtual community space so as to correspond to the action data (updating of the action and character parameters), and transmit to the shared server 105 a new behavior data based on the updated action and character parameters. Thus, the shared server 105 will transmit, by the multi-casting facility 106, to each client PC the new behavior data based on the updated action and character parameters.

Thereafter, the AO server 100 will judge, at step S56, whether the operation should be ended, and when it judges that the operation should not be ended, it will return to step S51 where it will repeat the above-mentioned operations.

Figure 7:
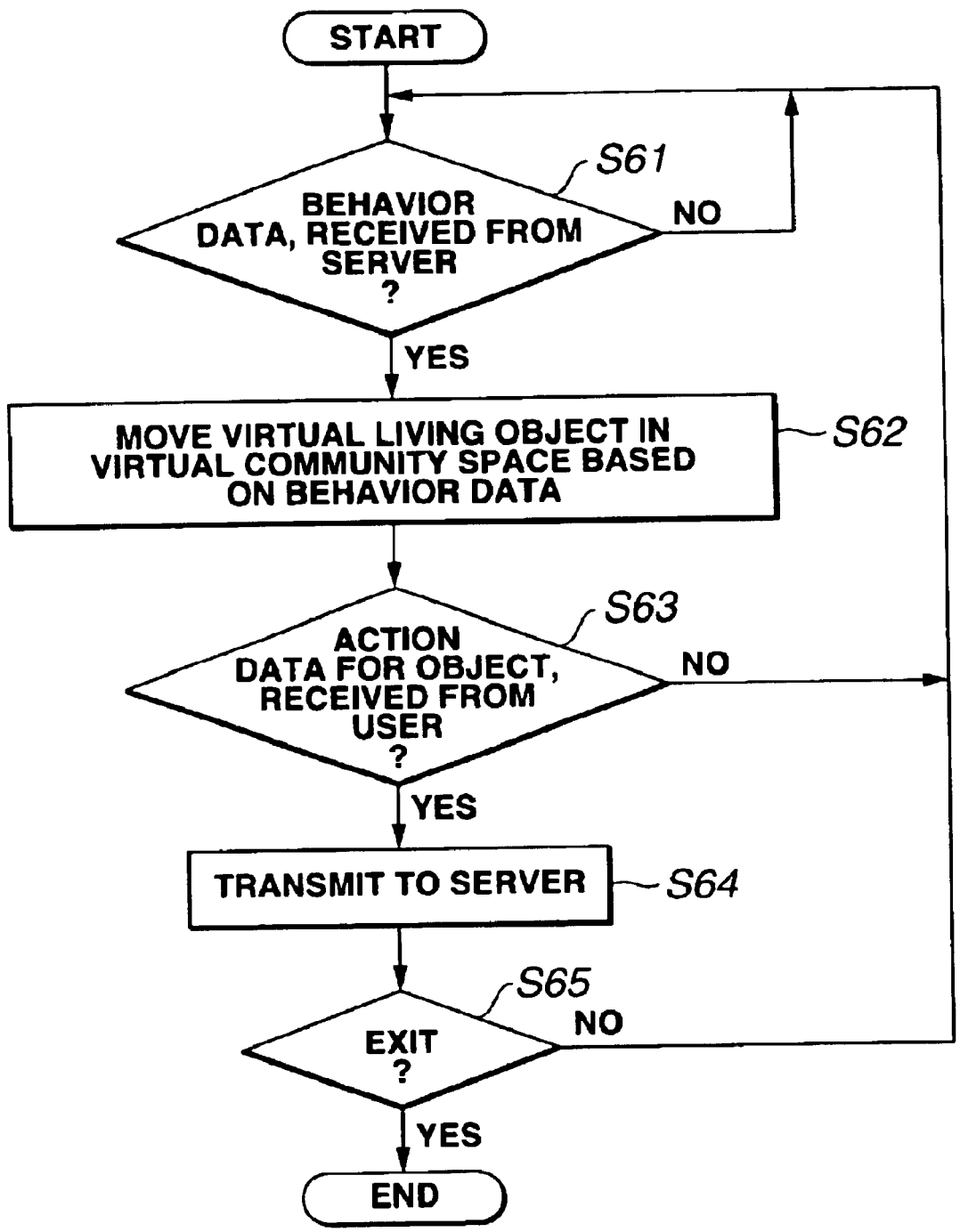
FIG. 7 is a flow chart of operations of the virtual living object in the virtual community space based on the behavior data and operations up to transmission to the AO server of an action the user has made to the virtual living object.

FIG. 7 shows a flow of operations up to putting, by operation at the client PC 110, the virtual living object 101 displayed in the virtual community space into action based on the behavior data transmitted from the AO server 100 and transmission to the AO server 100 of an action the user has made to the virtual living object 101.

As shown in FIG. 7, the client PC 110 waits, at step S61, for reception of the behavior data on the virtual living object 101, transmitted from the AO server 100 via the shared server 105.

When the behavior data has been received at step S61, the client PC 110 implement, at step S62, various actions such as such as joint movement, voicing, facial expression, etc. of the virtual living object 101 in the virtual community space based on the behavior data under the standardized protocol.

Next, the client PC 110 will wait, at step S63, reception of an action data on the virtual living object 101 from the user. When no action data has been entered from the user, the operation goes back to step S61. When an action data has been entered, the action data is transmitted, at step S64, to the AO server 100 via the shared server 105. Thus, in the AO server 100, the action and character parameters are updated according to the transmitted action data and behavior data based on the updated action and character parameters will be sent to the client PC 110. At the client PC 110, a virtual living object acting based on the behavior data will be displayed, that is, a virtual living object acting reflecting an action data entered by the user will be displayed.

Thereafter, the client PC 110 judges, at step S65, whether it should exit from the virtual community space. If it should not exit from the virtual community space, the operation goes back to step S61. If it should exit from the virtual community space, the operation is ended.

Referring now to FIG. 8, there is shown an example of parameter management table the object management node 102 of the AO server 100 has for each virtual living object As shown in FIG. 8, the parameter management table consists primarily of virtual living object data and user data.

The virtual living object includes a 3D (three-dimensional) ID for uniform identification of 3D virtual living objects in one virtual community space, 3D coordinate (address) of the virtual living object in the virtual community space, type of the virtual living object (e.g., human being, monkey, cat, etc.), sexuality of the virtual living object, nickname or name the user has given to the virtual living object, date the user has made an initialization for the virtual living object (e.g., birthday of the virtual living object), name of a virtual community space where the virtual living object has first been put (name of the permanent address), and object parameters.

The object parameters include two major groups, one including the aforementioned structure and movement parameters of the virtual living object and the other including action and character parameters.

The structure and movement parameters define the height and weight, skeletal structure and movement of the bones and joints of the virtual living object. The action and character parameters define the behavior of the virtual living object in the virtual community space based on its action, character, etc.

The structure and movement parameters and the action and character parameters will be explained in detail below concerning a human type virtual living object.

Figure 9:
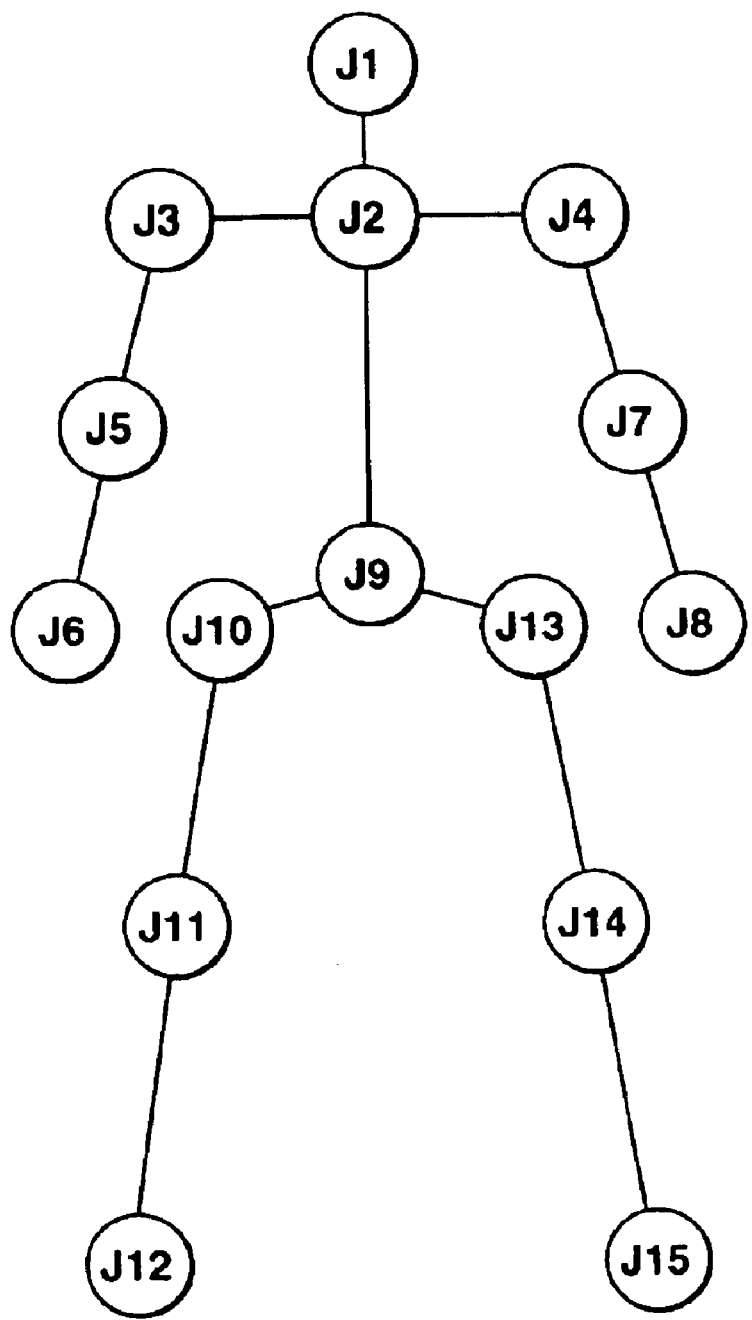
FIG. 9 explains the skeletal structure and joint IDs of a human-like virtual living object.

FIG. 9 shows the skeletal structure and joint IDs of a human-like virtual living object. Assume that as shown in FIG. 9 for example, bones and joints of the human type living object are identified with IDs (joint ID) such as J1 to J15, respectively. As shown in FIG. 10 for example, the structure and movement parameters include a height (cm), weight (k/g) of the virtual living object, joint IDs indicative of joints, respectively, of the skeletal structure of the virtual living object, coordinate (address) of each joint, mating joint for each joint, interarticular length (cm), and limit of joint movement (angle, for example). These information are shown as examples. Actually, the structure and movement parameters include more information. In the example shown in FIG. 10, the joint identified with J2 is located at a coordinate (x21, y21, z21), it mates with the joints J1, J3 and J4, these mating joints J1, J3 and J4 are 20, 15 and 15 cm, respectively, in length, and the angle through which the joint J2 can be moved is 60 deg.

FIG. 11 shows an example of action and character parameters. As shown, the parameters include a physical index, appetite index, health index, life time remainder, intelligence quotient, speech performance index, sociability index, independence index, activity index and mood index of the virtual living object. The action and character parameters are updated to ones calculated, using a predetermined action and character parameter calculation formula, from a timer event taking place with an elapsed time from the birthday initially set by the user, and a co-event and action event developed at the client PC.

The action and character parameters are updated as will be described below taking a simple example.

Each of the indices included in the action and character parameters takes a value ranging from 1/10 to 10/10. The index is lowest at the value 1/10 and highest at the value 10/10.

For example, when the virtual living object 101 in the virtual community space takes a meal with a higher appetite index, the physical index increases. The physical index will change depending upon the height and weight of the virtual living object. Thereafter, when a timer event takes place as the time passes, the weight included in the structure and movement parameters will decrease and thus the physical index will also decrease. In FIG. 11, the "life time remainder" indicates how long the virtual living object further survives, "intelligence quotient" indicates how intelligent the living object is, "speech performance index" indicates how high the intelligence of the virtual living object is, "sociability index" indicates how sociable the virtual living object is, "independence index" indicates how independent the virtual living object is, "activity index" indicates how active the virtual living object is, and "mood index" indicates whether the virtual living body is in good or bad mood.

Each time the action and character parameters including the above-mentioned indices are updated, a corresponding behavior data is transferred to each client PC by the multicasting facility 106 of the shared server 105. At each client PC, the behavior of the virtual living object is controlled based on the received behavior data. That is, at the client PC, a procedure for controlling the behavior of the virtual living object is described based on the received behavior data, a script program is executed, the value of a field of each node forming a 3D object, for representing a virtual living object in the VRML file is changed, a virtual living object reflecting the changed field value is rendered and displayed in the main window of the VRML browser, for example, on the monitor screen of the client PC.

Figure 12:
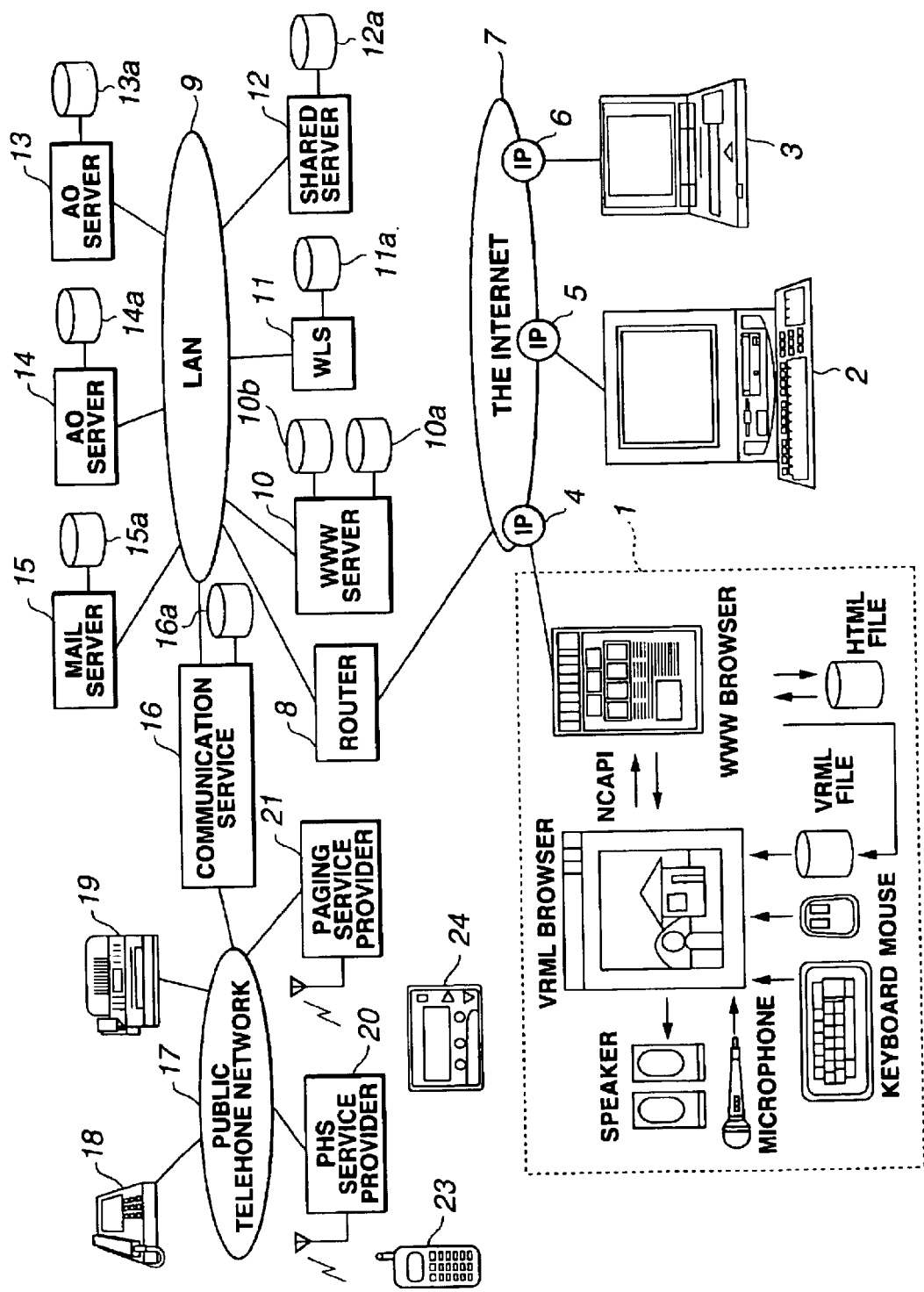
FIG. 12 shows a detailed configuration of the embodiment of information processing system according to the present invention.

FIG. 12 shows a detailed configuration of the embodiment of information processing system shown in FIG. 1.

As shown in FIG. 12, system components indicated with references 1, 2 and 3 are the previously mentioned client PCs (110, 120, 130, .. .) In which the VRML browser and WWW browser are installed. They are connected to an Internet 7 via IPs (Internet connection service Provider) 4, 5 and 6, respectively.

A LAN (local area network) 9 is connected to each client PC via the Internet 7 and router 8. The LAN 9 has connected thereto a WWW server 10, WLS (world location server) 11, shared server 12 (105), AO servers 13 and 14 (100), mail servers 15 and a communication server 16. The servers 10 to 16 have provided therein hard disc drives (HDD) 10a, 10b, 11a and 16a, respectively.

The communication server 16 is connected to a telephone 18 and facsimile 19 via a public telephone network 17, further to a PHS (personal handyphone system) terminal 23 via a PHS service provider 20, and to a pager terminal 24 via a paging service provider 21.

Figure 13:
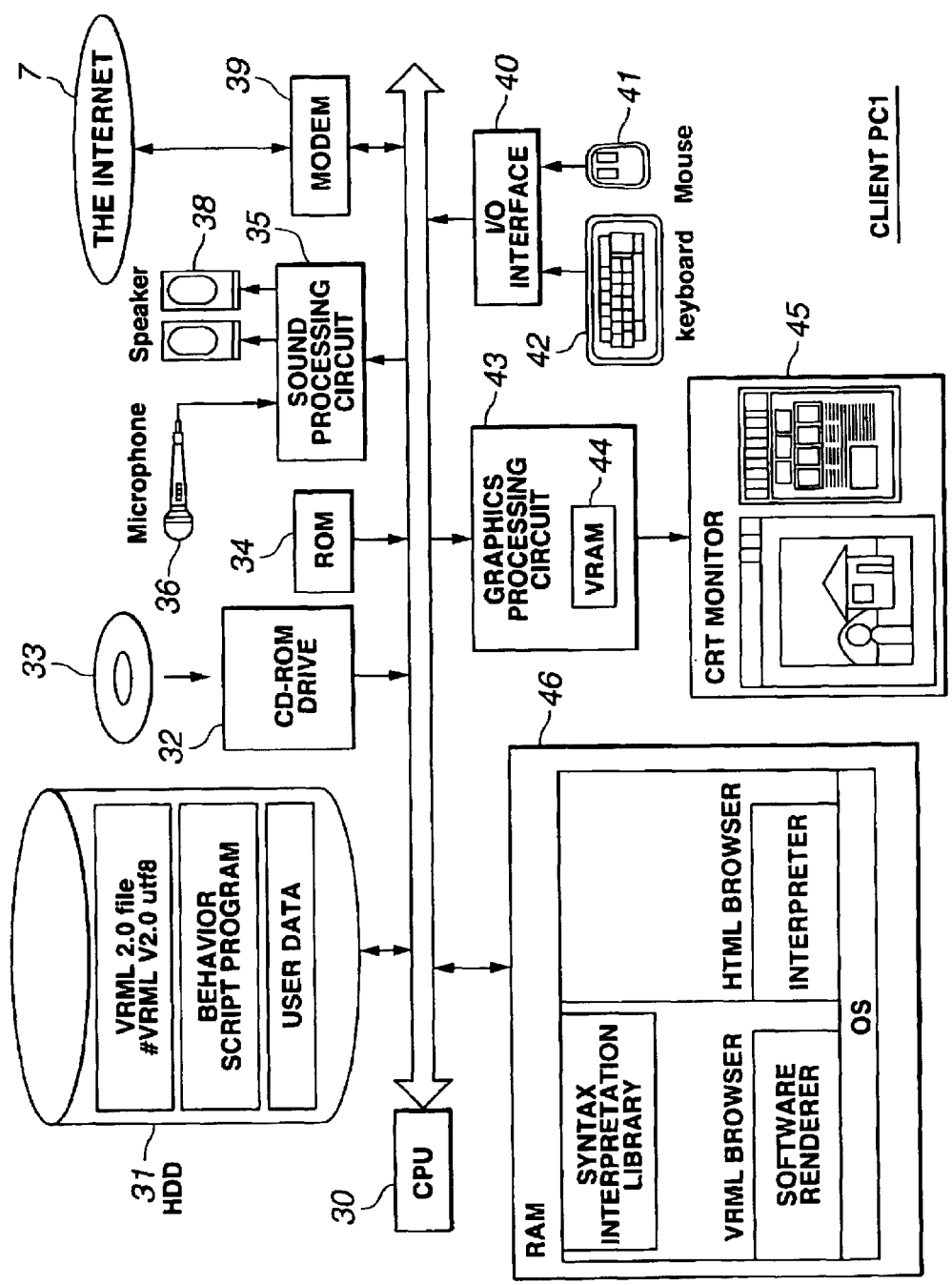
FIG. 13 is a block diagram of an example of the client PC in FIG. 12.

FIG. 13 is a hardware block diagram of the client PC 1 in FIG. 12.

As shown in FIG. 13, the client PC 1 includes a CPU 30 controlling all the component units of the client PC 1, a HDD 31 having stored therein the user data and a VRML content containing the VRML 2.0 file and Java-based virtual living object script program, a CD-ROM drive 32 to read the VRML content stored in a CD-ROM disc 33, a ROM 34 having BIOS (basic input output system). etc. stored therein, a sound processing circuit 35 having connected thereto a microphone 36 and right and left speakers 37 and 38, a modern 38 used for connection to the Internet 7, an I/O (input/output) interface 40 having a mouse 41 and keyboard 42 connected thereto, a graphic processing circuit 43 incorporating a VRAM 44, a CRT monitor 45, a RAM 46, etc. The RAM 46 has written thereto a WWW browser (e.g., Netscape Navigator (trademark)) working on an OS (e.g., Windows of the Microsoft), interpreter (e.g., Java interpreter) and a VRML 2.0 browser (e.g., Community Place Browser developed by the Sony), which are executable under the control of the CPU 30.

The VRML 2.0 browser has installed therein a VRML syntax interpretation library (parser) (e.g., QvLib developed by the Silicon Graphics, USA and opened to the public with no charge) and a software renderer (e.g., RenderWare of the Criterion Software Ltd., UK).

As shown in FIG. 13, the VRML 2.0 browser in the client PC transmits and receives a variety of data to and from the WWW browser (e.g., Netscape Navigator) based on NCAPI (Netscape Client Application Programming Interface (trademark)) for example.

When supplied with an HTML file and VRML content (including a VRML file and script program) from the WWW server 10 via the Internet 7, the WWW browser stores the data into the local HDD 31. The WWW browser will process the HTML file for display a text and image on the CRT monitor 45 while the VRML browser will process the VRML file for display a three-dimensional virtual space on the CRT monitor 45 and change the behavior of the object in the three-dimensional virtual space correspondingly to the result of processing of the script program by the interpreter.

Note the other client PCs 2 and 3 are similar in construction (not shown) to the client PC 1.

The information processing system constructed as shown in FIG. 12 functions as will be described below.

Figure 14:
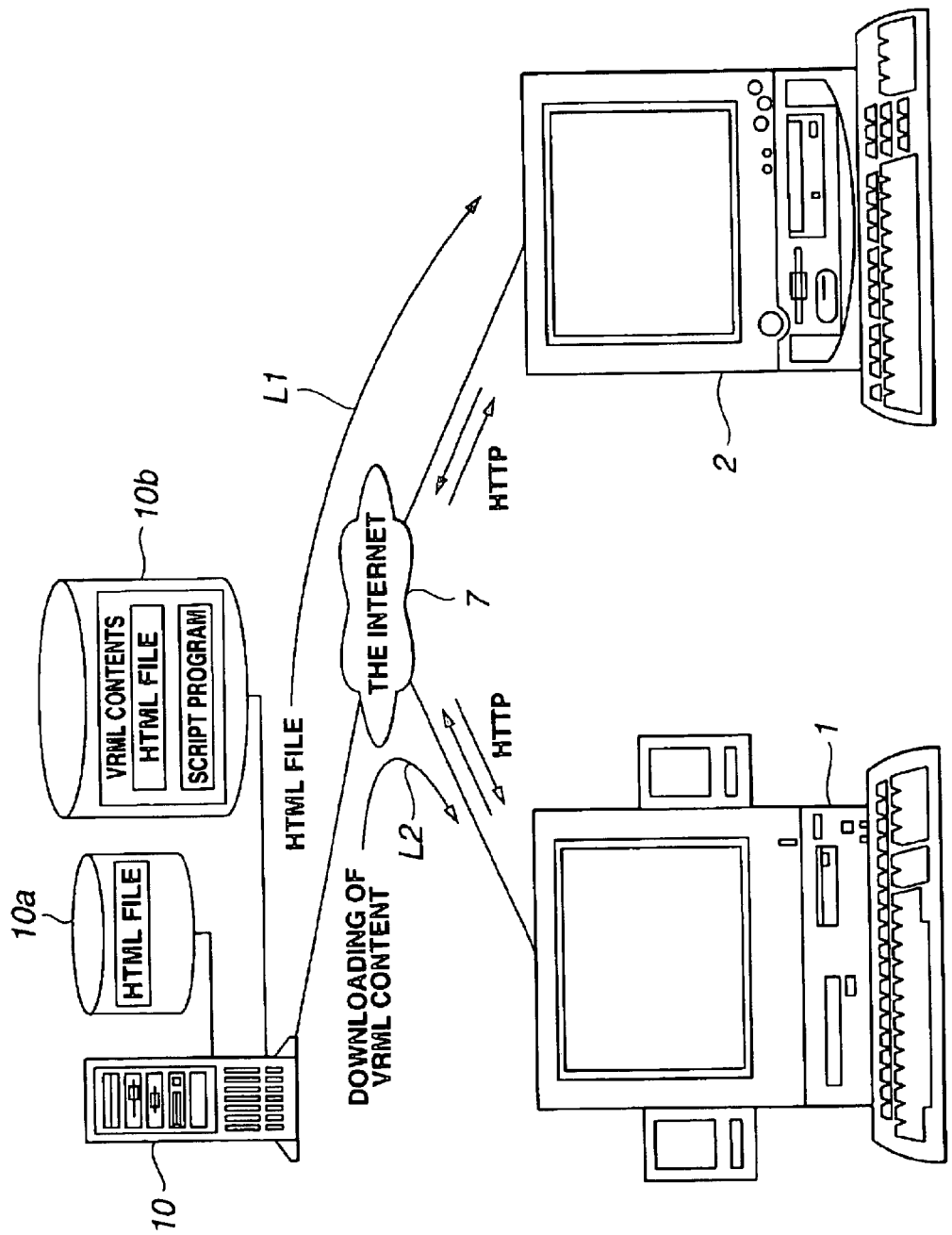
FIG. 14 explains the flow of operations from reading a home page at a web site serving VRML contents up to downloading of a VRML content to the client PC, in the information processing system in FIG. 12.

First, the VRML content is downloaded via the Internet 7 and then a virtual space is made a multi-user environment shared by a plurality of users. This procedure will be described below with reference to FIGS. 14 to 16. FIG. 14 shows the flow of operations from reading a home page at a web site serving VRML contents up to downloading of a VRML content to the client PC, FIG. 15 shows the flow of operations up to interpretation and execution of VRML 2.0 file by the client PC and inquiry of URL of the shared server, and FIG. 16 shows the flow of operations from reception by a plurality of client PCs of data on a three-dimensional object view the shared server up to implementation of a multi-user environment.

As shown in FIG. 14, first the WWW browser is used to read, as indicated by an arrow L1, a home page at a web site, for example, where the VRML content is offered. Next, the users of the client PCs 1 and 2 download a VRML content including a VRML 2.0 file and a script program (e.g., Java-based script program) for implementation of a behavior in the VRML space, as indicated with an arrow L2. Of course, they may have the CD-ROM drive 32 read the CD-ROM 33 containing a VRML content.

Figure 15:
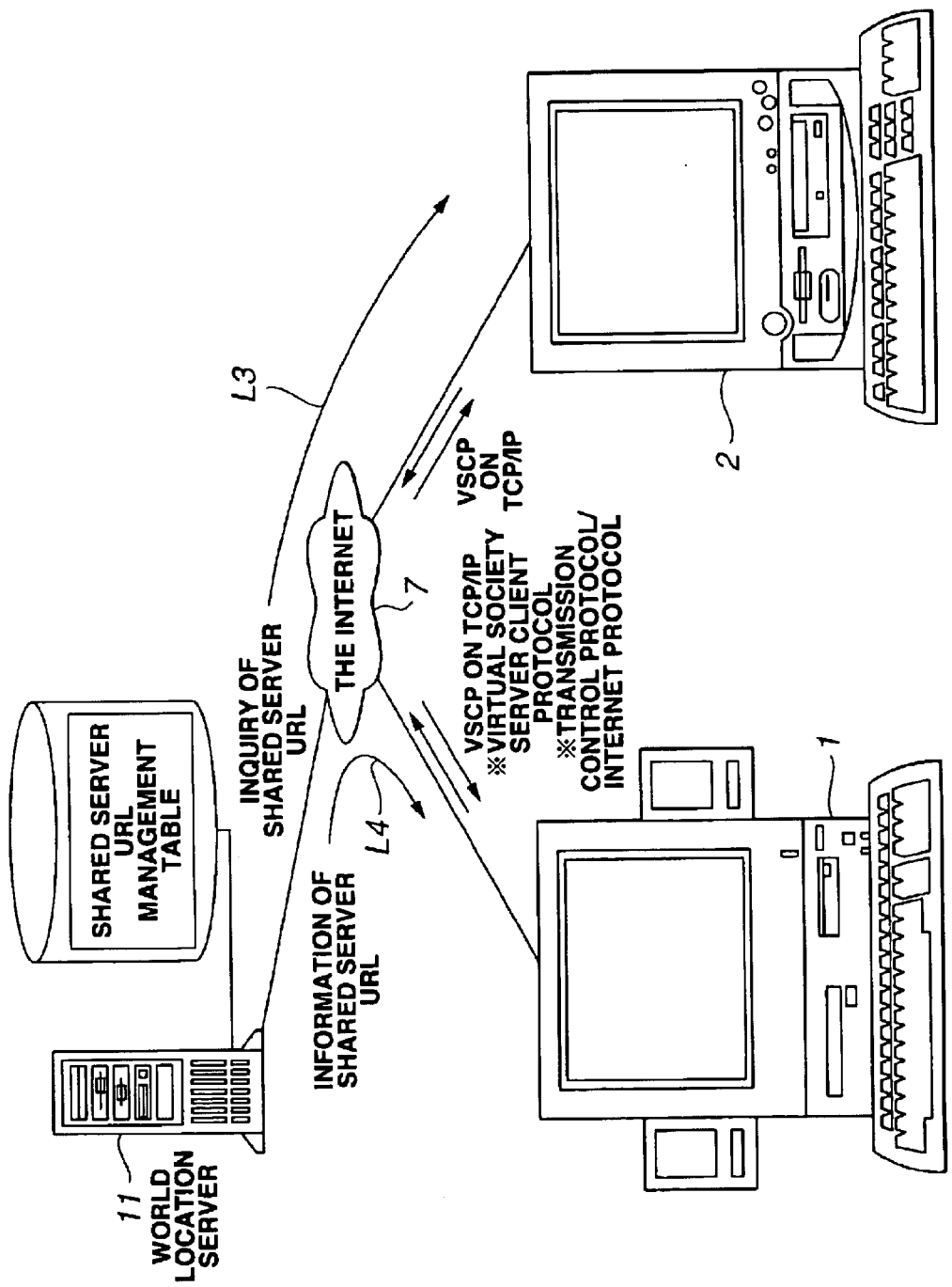
FIG. 15 explains the flow of operations up to interpretation and execution of VRML 2.0 file by the client PC and inquiry of URL (uniform Resource Locater) of the shared server, in the information processing system in FIG. 12.

Next, as shown in FIG. 15, at the client PCs 1 and 2, the 2.0 file downloaded and once stored in the local HDD 31 is interpreted and executed by the VRML 2.0 browser, and an inquiry is made to the WLS 11 of URL of the shared server 12, as indicate with an arrow L3, based on VSCP (Virtual Society Server Client Protocol). At this time, the WLS 11 refers to a shared server URL management table stored in the HDD 11a and informs the client PCs 1 and 2 of the URL of the shared server 12, as indicated with an arrow L4.

Figure 16:
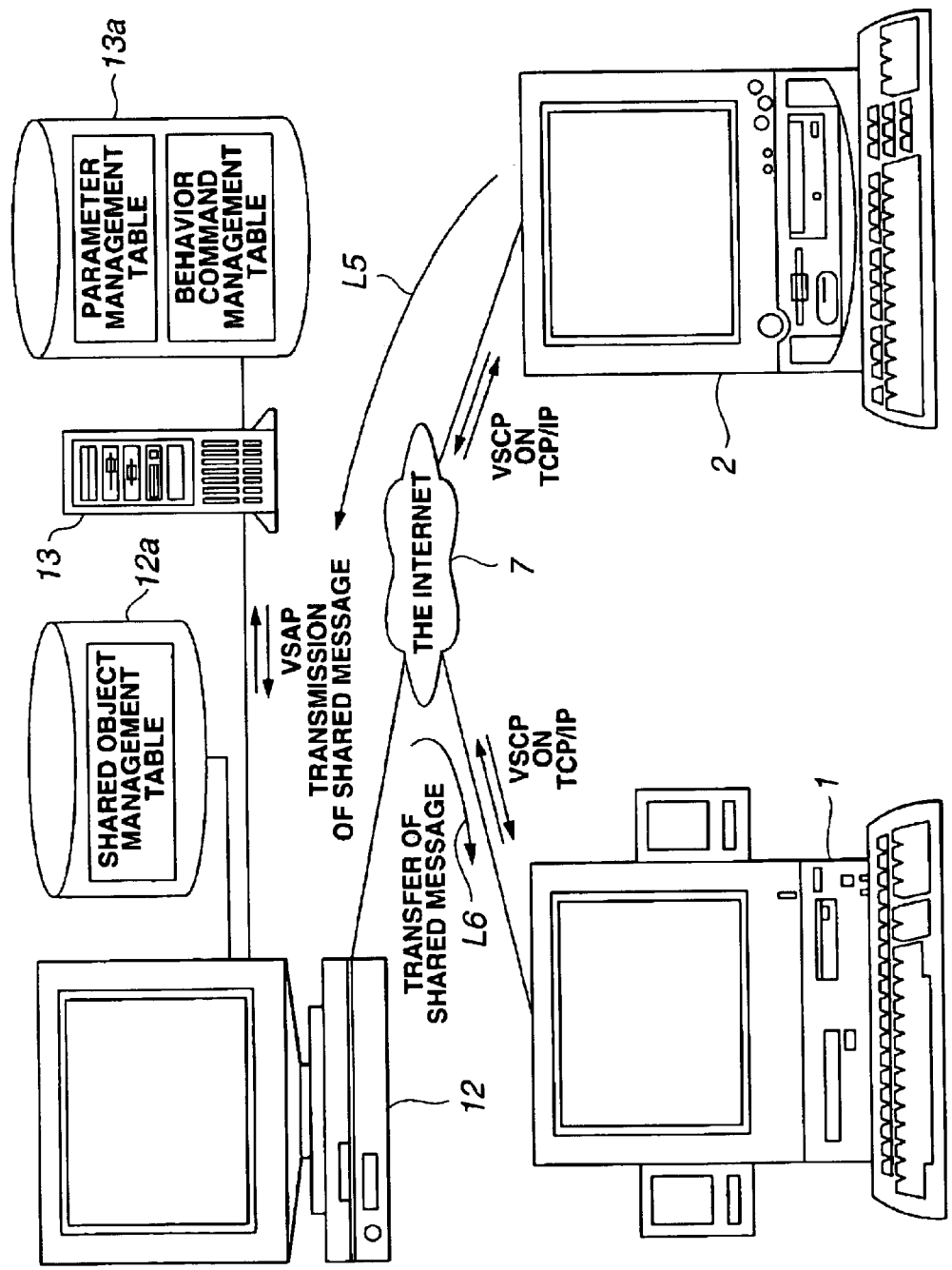
FIG. 16 explains the flow of operations from reception by a plurality of client PCs of data on a three-dimensional object view the shared saver up to implementation of a multi-user environment, in the information processing system in FIG. 12.

The URL (Uniform Resource Locator) is used for the client PCs 1 and 2 to be connected to the shared server 12 as shown in FIG. 16. As a result, a shared message concerning the position and movement of the shared 3D (three-dimensional) object is transmitted via the shared server 12 as indicated with an arrow L5 and transferred as indicated with an arrow L6, thus a multi-user environment is implemented.

Note that the detailed description of the above connecting procedure is referred to the Japanese Unexamined Patent Publication No. 9-8178/1.

In the embodiment of the present invention, the information serving medium by which the computer program for execution of the above procedure is served to the user includes an information recording medium such as a magnetic disc and CD-ROM, and in addition, a network transmission medium such as Internet, digital communication satellite, etc.

What is claimed is:

1. An information processing system including:

a server;

a network; and plural terminals each configured to be connected to the server via the network, wherein the server provides data defining a virtual community space accessible from each of the terminals, wherein each of the terminals provides a movement interpretation node configured to set forth parameters needed for interpretation of the movement of an associated virtual living object based upon user input and to provide the movement interpretation node to the server via the network, the parameters defining at least bones and joints of the associated virtual living object, limits of joint movement, and movement of the bones and joints, and wherein the server provides a management node configured to determine at least some movements for each virtual living object in the virtual community space based on the movement interpretation node received from each terminal.

2. The information processing system as set forth in claim 1, wherein the management node for the virtual living object manages at least the action of the virtual living object in the virtual community space based on the movement interpretation node parameters.

3. An information processing method comprising the steps of:

building a virtual living object at a terminal;

determining a movement interpretation node setting forth at least some parameters needed for interpretation of at least some of the movements of the associated virtual living object at the terminal, the parameters defining at least bones and joints of the associated virtual living object, limits of joint movement, and movement of the bones and joints;

connecting the terminal to a server via network;

building a virtual community space based on information supplied from the server; and transmitting the virtual living object along with the associated movement interpretation node to the server to at least in part manage movement of the associated virtual living object in the virtual community space.

4. An information processing method comprising the steps of:

connecting a server to a terminal via a network;

receiving data over the network from the terminal indicating a virtual living object built by the terminal and a movement interpretation node setting forth at least some parameters needed for interpretation of at least some of the movements of the virtual living object node, the parameters defining at least bones and joints of the associated virtual living object, limits of joint movement, and movement of the bones and joints, and generating a management node for determining at least one movement of the virtual living object in a virtual community space based on the movement interpretation node being received.

5. The method as set forth in claim 4, wherein:

the management node for the virtual living object manages at least the action of the virtual living object in the virtual community space based on the at least one parameter.

6. An information processing apparatus comprising:

means for building a virtual living object and determining an associated movement interpretation node setting forth at least some parameters needed for interpretation of at least some of the movements of the virtual living object, the parameters defining at least bones and joints of the associated virtual living object, limits of joint movement, and movement of the bones and joints;

means for connecting to a server via a network;

means for building a virtual community space based on information from the server; and means for transmitting the virtual living object along with the associated movement interpretation node to the server to at least in part manage movement of the associated virtual living object in the virtual community space.

7. An information processing apparatus comprising:

means for connecting to a terminal via a network;

means for receiving terminal transmitted data from the network; and means for generating a management node for managing at least one movement of a virtual living object in a virtual community space based on a movement interpretation node being received as part of said terminal transmitted data, wherein the terminal transmitted data indicates the virtual living object and the associated movement interpretation node setting forth at least some parameters needed for interpretation of at least some of the movements of the virtual living object, the parameters defining at least bones and joints of the associated virtual living object, limits of joint movement, and movement of the bones and joints.

8. The apparatus as set forth in claim 7, wherein:

the management node for the virtual living object manages at least the action of the virtual living object in the virtual community space based on the at least one parameter.

9. A computer readable medium including a computer executable information processing method for use with a server, a network, and plural terminals each configured to be connected to the server via the network, comprising:

a first computer code configured for the server to provide data defining a virtual community space accessible from each of the terminals;

a second computer code configured for each of the terminals to provide a movement interpretation node configured to set forth parameters needed for interpretation of the movement of an associated virtual living object based upon user input and to provide the movement interpretation node to the server via the network, the parameters defining at least bones and joints of the associated virtual living object, limits of joint movement, and movement of the bones and joints; and a third computer code configured for the server to provide a management node configured to determine at least some movements for each virtual living object in the virtual community space based on the movement interpretation node received from each terminal.

10. The computer readable medium as set forth in claim 9, wherein the management node for the virtual living object manages at least the action of the virtual living object in the virtual community space based on the movement interpretation node parameters.

11. A computer readable medium including a computer executable information processing method, comprising:

a first computer code configured to build a virtual living object at a terminal;

a second computer code configured to determine a movement interpretation node setting forth at least some parameters needed for interpretation of at least some of the movements of the associated virtual living object at the terminal, the parameters defining at least bones and joints of the associated virtual living object, limits of joint movement, and movement of the bones and joints, the terminal being connected to a server via network;

a third computer code configured to build a virtual community space based on information supplied from the server; and a fourth computer code configured to transmit the virtual living object along with the associated movement interpretation node to the server to at least in part manage movement of the associated virtual living object in the virtual community space.

12. A computer readable medium including a computer executable information processing method for use with a server connected to a terminal via a network, comprising:

a first computer code configured to receive data over the network from the terminal indicating a virtual living object built by the terminal and a movement interpretation node setting forth at least some parameters needed for interpretation of at least some of the movements of the virtual living object node, the parameters defining at least bones and joints of the associated virtual living object, limits of joint movement, and movement of the bones and joints, and a second computer code configured to generate a management node for determining at least one movement of the virtual living object in a virtual community space based on the movement interpretation node being received.

13. The computer readable medium as set forth in claim 12, wherein:

the management node for the virtual living object manages at least the action of the virtual living object in the virtual community space based on the at least one parameter.

14. A computer readable medium including a computer executable information processing apparatus for use with a server connected to a network, comprising:

a first computer code configured to build a virtual living object and determining an associated movement interpretation node setting forth at least some parameters needed for interpretation of at least some of the movements of the virtual living object, the parameters defining at least bones and joints of the associated virtual living object, limits of joint movement, and movement of the bones and joints;

a second computer code configured to build a virtual community space based on information from the server; and a third computer code configured to transmit the virtual living object along with the associated movement interpretation node to the server to at least in part manage movement of the associated virtual living object in the virtual community space.

15. A computer readable medium including a computer executable information processing apparatus for use with a terminal connected to a network, comprising:

a first computer code configured to receive terminal transmitted data from the network; and a second computer code configured to generate a management node for managing at least one movement of a virtual living object in a virtual community space based on a movement interpretation node being received as part of said terminal transmitted data, wherein the terminal transmitted data indicates the virtual living object and the associated movement interpretation node setting forth at least some parameters needed for interpretation of at least some of the movements of the virtual living object, the parameters defining at least bones and joints of the associated virtual living object, limits of joint movement, and movement of the bones and joints.

16. The computer readable medium as set forth in claim 15, wherein:

the management node for the virtual living object manages at least the action of the virtual living object in the virtual community space based on the at least one parameter.

17. An information processing apparatus comprising:

a first control configured to build a virtual living object and determine an associated movement interpretation node setting forth at least some parameters needed for interpretation of at least some of the movements of the virtual living object, the parameters defining at least bones and joints of the associated virtual living object, limits of joint movement, and movement of the bones and joints;

a connector configured to connect to a server via a network;

a second control configured to build a virtual community space based on information from the server; and a transmitter configured to transmit the virtual living object along with the associated movement interpretation node to the server to at least in part manage movement of the associated virtual living object in the virtual community space.

18. An information processing apparatus comprising:

a connector configured to connect to a terminal via a network;

a receiver configured to receive terminal transmitted data from the network; and a control configured to generate a management node for managing at least one movement of a virtual living object in a virtual community space based on a movement interpretation node being received as part of said terminal transmitted data, wherein the terminal transmitted data indicates the virtual living object and the associated movement interpretation node setting forth at least some parameters needed for interpretation of at least some of the movements of the virtual living object, the parameters defining at least bones and joints of the associated virtual living object, limits of joint movement, and movement of the bones and joints.

* * * * *

UNITED STATES PATENT AND TRADEMARK OFFICE
CERTIFICATE OF CORRECTION

PATENT NO. : 6,820,112 B1
DATED : November 16, 2004
INVENTOR(S) : Koichi Matsuda et al.

It is certified that error appears in the above-identified patent and that said Letters Patent is hereby corrected as shown below:

Column 1,
Line 37, delete "take"
Line 60, change "fiction" to -- function --
Line 63, insert -- an -- before "alter"

Column 2,
Line 29, change "calender" to -- calendar --

Column 5,
Line 45, change "an" to -- a --

Column 7,
Line 35, change "object1" to -- object --

Column 9,
Line 6, "kanji" should be -- *kanji* --

Column 12,
Line 36, change "indicate" to -- indicated --

Signed and Sealed this

Second Day of August, 2005

JON W. DUDAS
*Director of the United States Patent and Trademark Office*